United States Patent
Cho et al.

(10) Patent No.: US 11,567,158 B2
(45) Date of Patent: Jan. 31, 2023

(54) METHOD OF BEACON-BASED POSITIONING SYSTEM

(71) Applicant: SOLiD, Inc., Seongnam-si (KR)

(72) Inventors: Young Man Cho, Sancheong-gun (KR); Yvonne Hee Jun Cho, Warrenton, VA (US)

(73) Assignee: SOLiD, Inc., Seongnam-si (KR)

( * ) Notice: Subject to any disclaimer, the term of this patent is extended or adjusted under 35 U.S.C. 154(b) by 166 days.

(21) Appl. No.: 17/006,764

(22) Filed: Aug. 28, 2020

(65) Prior Publication Data

US 2022/0065973 A1    Mar. 3, 2022

(51) Int. Cl.
| | |
|---|---|
| *G01S 1/04* | (2006.01) |
| *G01S 5/02* | (2010.01) |
| *H04B 17/318* | (2015.01) |
| *H04W 16/18* | (2009.01) |
| *H04W 16/20* | (2009.01) |

(52) U.S. Cl.
CPC .......... *G01S 1/0423* (2019.08); *G01S 5/0242* (2013.01); *G01S 5/02524* (2020.05); *H04B 17/318* (2015.01); *H04W 16/18* (2013.01); *H04W 16/20* (2013.01)

(58) Field of Classification Search
CPC .. G01S 1/0423; G01S 5/0242; G01S 5/02524; G01S 2205/02; H04W 16/18; H04W 16/20; H04B 17/318
See application file for complete search history.

(56) References Cited

U.S. PATENT DOCUMENTS

| | | | | |
|---|---|---|---|---|
| 5,987,328 | A * | 11/1999 | Ephremides | H04W 16/18 455/446 |
| 9,674,648 | B1 * | 6/2017 | Greenberger | H04W 16/20 |
| 2008/0057873 | A1 * | 3/2008 | Huang | H04W 16/20 455/67.11 |
| 2008/0180227 | A1 * | 7/2008 | Le | H04L 12/66 340/286.02 |
| 2008/0182584 | A1 * | 7/2008 | Le | H04W 16/20 455/446 |
| 2015/0296388 | A1 * | 10/2015 | Bassi | H04W 24/10 455/446 |
| 2017/0332248 | A1 * | 11/2017 | Syrjärinne | G01S 5/0242 |
| 2019/0306724 | A1 * | 10/2019 | Guenot-Falque | H04W 16/20 |
| 2021/0392513 | A1 * | 12/2021 | Shapiro | G01S 5/0221 |

FOREIGN PATENT DOCUMENTS

CN          110839245 A   *   2/2020  ........... H04W 16/18

* cited by examiner

*Primary Examiner* — Gregory C. Issing
(74) *Attorney, Agent, or Firm* — Insight Law Group, PLLC; Seung Lee (57) ABSTRACT

Disclosed is a beacon-based positioning system. A beacon position in which a beacon is installable is defined in a target space, and a path loss model of radio frequency (RF) signals between all beacon positions and all observation positions of a scanner is determined. Among all possible installation plans for the beacon positions, an installation plan in which different beacon signals, whose RSSIs calculated using the path loss model have significant values, are received in a number greater than or equal to a minimum reference number and a total number of the beacons installed is minimum is determined as an optimal installation plan. The optimization problem of determining the optimal installation plan may be expressed by binary linear programming.

15 Claims, 4 Drawing Sheets

METHOD OF BEACON-BASED POSITIONING SYSTEM

BACKGROUND

1. Field

The present invention relates to a computing technology in the information and communication field, and more particularly, to a beacon-based positioning system.

2. Description of Related Art

Internet of Things (IoT) technology has been applied to various fields. A proximity based service (PBS) provides a position-dependent service for a user device that has detected a radio wave signal emitted from a broadcasting device, whose position is known a priori, such as a Bluetooth beacon, a Wi-Fi beacon, and the like. In addition, there is also development of a location-based service (LBS) that identifies the position of the user device by applying a triangulation methodology to signal strength values of signals emitted from three or more of the beacons. In order to provide such LBS, a large number of beacons need to be installed. As the number of beacons to be installed increases, the relevant cost increases and the aesthetic quality of the space may degrade. In addition, since the beacons transmit signals over a limited number of frequency bins within the same band, interference among beacon signals increases.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention relates to providing an efficient tool for designing an installation position of beacons in a beacon-based positioning system.

Furthermore, the present invention relates to providing a beacon-based positioning system that ensures a required positioning precision with minimal cost.

Furthermore, the present invention relates to providing a beacon-based positioning system that ensures a required positioning precision by reflecting a constraint(s) on beacon installation.

In one general aspect, a beacon position in which a beacon is installable is defined in a target space, and a path loss model of RF signals between all beacon positions and all observation positions of a scanner is determined. Among all possible installation plans for the beacon positions, an installation plan in which different beacon signals, whose received signal strength indicators (RSSIs) calculated using the path loss model have significant values, are received in a number greater than or equal to a minimum reference number and a total number of beacons to be installed is minimum is determined as an optimal installation plan.

The beacon position may be defined by beacon grids that partition the target space into N pieces, and the observation position may be defined by scan grids that partition the target space into M pieces, A simple path loss model is proposed in which the influence of interference, noise, and the like is excluded, and only fading is considered. Values of signal reception strengths measured with respect to one of the beacon grids and the combination of the selected scan grids are collected so that parameters of the path loss model of RF signals may be determined.

The path loss modeling may be assisted by a modeling guide device based on a map of the target space.

The optimal installation plan may be determined as a beacon installation plan that minimizes an objective function expressing the total number of beacons to be installed in the target space under a constraint expressing the possibility of positioning at a measuring point.

The constraint may be defined as a constraint matrix that expresses whether a received signal strength indicator (RSSI) value of a signal received at a scan grid j upon being transmitted from a beacon position i is significant.

The optimization problem of determining the optimal installation plan may be solved by binary linear programming.

Other features and aspects will be apparent from the following detailed description, the drawings, and the claims.

Throughout the drawings and the detailed descriptions, unless otherwise described, the same drawing reference numerals will be understood to refer to the same elements, features, and structures. The relative sizes and depictions of these elements may be exaggerated for clarity, illustration, and convenience.

DETAILED DESCRIPTION

The foregoing and additional aspects of the present invention will be embodied through the following exemplary embodiments. It should be understood that various combinations of elements in each exemplary embodiment are possible unless otherwise specified or contradicted within the exemplary embodiment.

Figure 1:
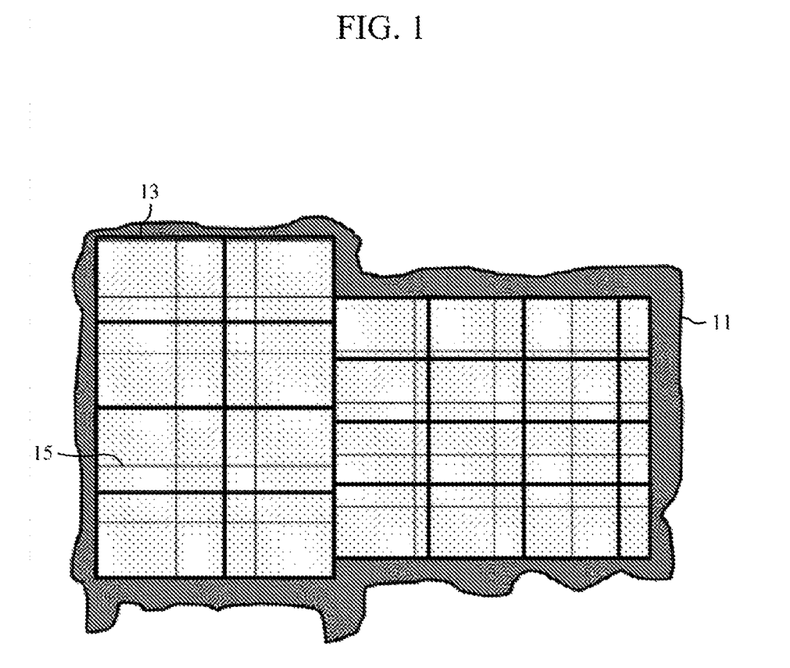
FIG. 1 is an exemplary view schematically illustrating a target space, a beacon space, and an observation space.

According to one aspect of the proposed invention, a beacon position and an observation position are defined in a target space. FIG. 1 is an exemplary view schematically illustrating the target space, the beacon position, and the observation position. The target space is a space to which a positioning system is applied and is defined as a space requiring measurement rather than being defined as a physical space. The target space may be a space in various forms including a polygon but may not need to be a connected space. In the present specification, a beacon is a device that emits a radio frequency (RF) signal of a known signal strength at a known position and may be, for example, a WiFi access point, a Bluetooth Beacon, and may further be a base station for wireless communication. An installation space, which is a range in which a beacon is installable, does not need to coincide with the target space. For example, the target space may have an area in which beacon installation is excluded for the aesthetic quality.

According to an aspect, the beacon position may be defined by beacon grids that partition the target space into N pieces. In order to define the beacon position, which is a position where a beacon is installable, the target space may be partitioned by the beacon grids. The beacon may be installed at a certain point in the target space, but by properly limiting the point where the beacon is installable and defining the beacon grid, the optimization issue may be simplified. In the embodiment, it is assumed that the beacon is installed at the center of the beacon grid.

In the present specification, a scanner is a terminal capable of receiving beacon signals and processing positioning according to aspects of the proposed invention, such as a mobile phone with a built-in beacon signal receiving device. The observation space, which is in a range requiring positioning, does not need to coincide with the target space. For example, an area of the target space which does not render ready entry or exit of a person may be excluded from the observation space.

According to one aspect, the observation position may be defined by scan grids that partition the target space into M pieces. The scanner may perform positioning at a certain point in the target space, but by properly limiting the point in which the scanner perform positioning and defining the observation grid, the optimization problem may be simplified. In the embodiment, it is assumed that the scanner performs positioning at the center of the observation grid. By properly defining the observation grid, the proposed invention may derive results with a precision higher than or equal to a reference level not only at the center of the observation grid but also at all positions in the observation space.

In FIG. 1, the target space 11 is indicated by a hatched area. A thick solid line shows a beacon grid 13, and a thin solid line shows an observation grid 15. In the illustrated example, the beacon grid 13 is shown at non-uniform intervals in the target space 11, and the observation grid 15 filled with dot patterns is shown at uniform intervals. The target space 11, an observation space defined by the observation grid 15, and an installation space defined by the beacon grid 13 are shown to be slightly different in arrangement and size. The beacon grid may be determined to have a different grid interval at each position in consideration of constraints on beacon installation or required position precision. The observation grid may also be set to have a different grid interval at each position in consideration of the interval of the beacon grids, the uniformity of the wireless environment, and the calculation amount.

Figure 2:
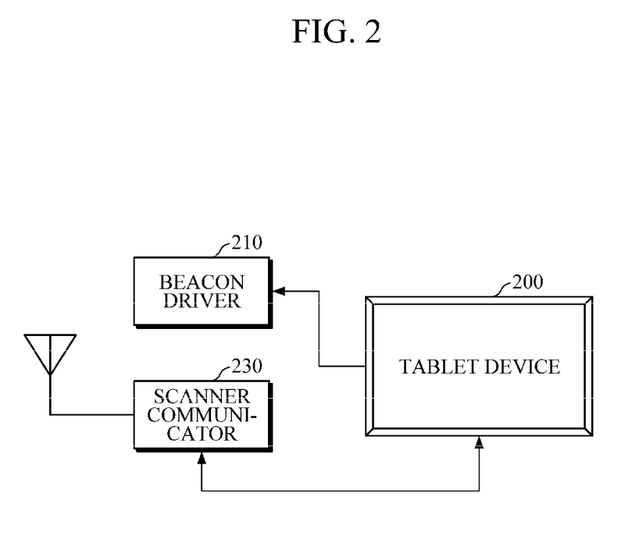
FIG. 2 is a block diagram illustrating the configuration of a modeling guide device according to an embodiment.

According to an additional aspect, path loss modeling may be assisted by a modeling guide device based on a map of a target space. FIG. 2 is a block diagram illustrating the configuration of the modeling guide device according to an embodiment. For example, the modeling guide device may be implemented using a tablet device and a tablet-based application program. A tablet device 200 executes a modeling guide application. Beacons are installed in sampled beacon grids among the beacon grids in the target space as shown in FIG. 1. The beacons may communicate with a beacon driver 210 in a wired or wireless manner. In addition, scanners are installed in sampled observation grids among the observation grids in the target space. The scanners may communicate with a scanner communicator 230 in a wireless manner. The modeling guide application of the tablet device 200 may select a particular beacon through the beacon driver 210 to set parameters of wireless communication or instruct the start or end of transmission. In addition, the modeling guide application of the tablet device 200 may receive a received signal strength indicator (RSSI) value of a signal received from a particular beacon by a particular scanner through the scanner communicator 230. The scanner, for example, a smartphone with a built-in Bluetooth module that receives a beacon signal, may include and execute an application that relays an RSSI value received from a beacon and reception information including an identification of the beacon.

In the embodiment, the modeling guide application executed on the tablet device 200 automatically performs path loss modeling based on the beacons and scanners installed in the target space. The tablet device 200 selects one of the beacons and drives the selected beacon and simultaneously receives RSSI values from the scanners and stores the received RSSI values. Then, the tablet device 200 selects the next beacon and drives the selected next beacon and simultaneously receives RSSI values from the scanners and stores the RSSI values. When such a process is repeated and thus the measuring the RSSI at required observation positions for all installation plans of the beacon grids in the target space is completed, the modeling guide application determines a path loss modeling that may be applied to all pairs of {beacon position, observation position} on the basis of the measured values. Such a calculation may be performed in the tablet device 200 or may be performed in a service server to which the measured RSSI values are relayed.

In another embodiment, the tablet device 200 displays an observation grid that requires measurement on a map in which a target space is partitioned by beacon grids and observation grids. The user moves to the displayed observation grid and measures the RSSI and inputs the measured value. For example, the modeling guide application may select an observation point that is required for positioning of the target space on the basis of a positioning precision set by the user. The selection of the observation point may be determined considering not only the physical shape of the target space, but also the distribution of RSSI values of the observation point on which the measurement is completed. For example, an area allowing path loss modeling within a pre-determined error with respect to a particular beacon installation plan may not require additional measurement.

When such a process is repeated and thus the RSSI measurement at the required observation positions for all installation plans of the beacon grids in the target space is completed, the modeling guide application determines a path loss modeling that may be applicable to all pairs of {beacon position, observation position} on the basis of the measured values. Such a calculation may be performed in the tablet device 200 or may be performed in a service server to which the measured values are transmitted.

Figure 3:
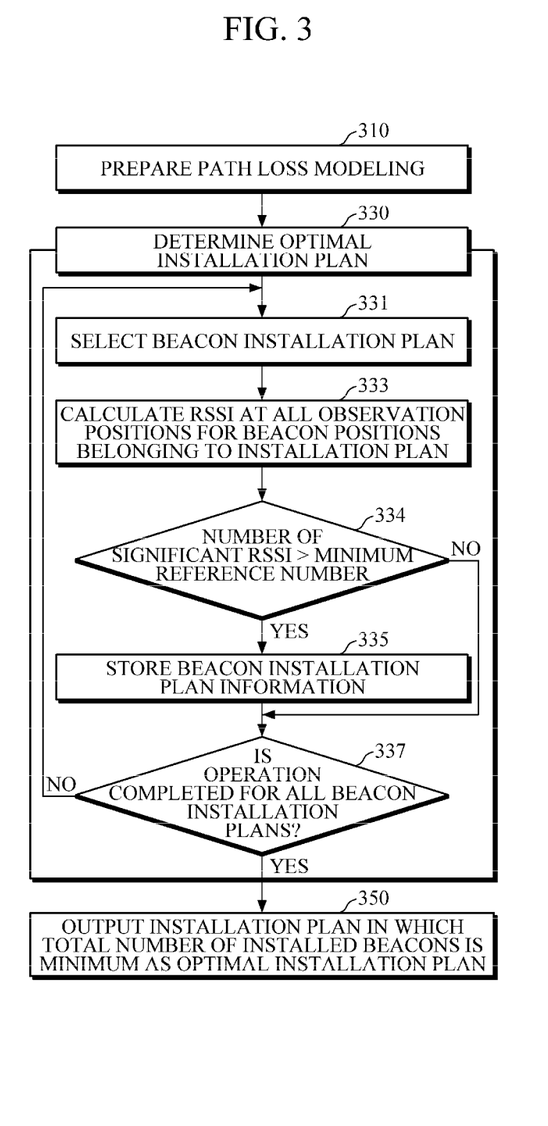
FIG. 3 is a flowchart showing the configuration of a design methodology of a positioning system according to an embodiment.

FIG. 3 is a flowchart showing the configuration of a design method of a positioning system according to an embodiment. Referring to FIG. 3, the design method of the positioning system according to the embodiment includes preparation operation for a path loss modeling 310 and determination operation for an optimal installation plan 330. According to an aspect, in preparation operation for the path loss modeling 310, a beacon position in which a beacon is installable in a target space is defined as described above. Then, a path loss model of RF signals between all beacon positions and all observation positions is determined. The path loss model may be determined in advance and input into a system in which the proposed invention is implemented, or a tool for assisting the path loss modeling may be included as a part of the system. Alternatively, a tool for automatically executing the path loss modeling may be included as a part of the system.

Location calculation in a location-based service (LBS) is performed based on an attenuation level of an RF signal from an RF source having a reference power level or a known power level to a measurement point. Modeling a path loss is not easy due to fading, interference caused by other devices using the same frequency band, or noise.

According to an additional aspect, a simple path loss model in which an influence of interference and noise is excluded and only fading is considered is proposed. Influence of other uncontrollable noises on distance information calculation is minimized using statistical techniques. The values of signal reception strengths measured with respect to one of the beacon grids and the combination of the selected scan grids are collected, and parameters of the path loss model of the RF signal may be determined using the collected values.

The path loss model of the RF signal may be expressed as follows.

[Expression 1]

$$RSSI = C - 10\beta \log_{10}\left(\frac{d}{d_0}\right) + V \quad \text{[Expression 1]}$$

Herein,
RSSI: a received signal strength indicator
ß: a path loss exponent
d: a distance between a scanner and a beacon
$d_0$: a reference distance
C: an average RSSI at a distance of $d_0$
v: interference from other devices or noise In the embodiment, the path loss modeling is prepared by obtaining parameters (C, ß) of the path loss model expressed by Expression 1. The parameters (C, ß) may be expressed as a function of a measuring position. Furthermore, the parameters (C, ß) may have values which are varied depending on an installation plan provided by all beacon positions. In addition, the parameter C may have a value which is varied according to the reference distance $d_0$.

In the embodiment, the parameters may be determined through a measurement experiment in the target space. For example, beacons are installed at respective beacon positions in the target space of FIG. 1. It may be preferable to install beacons at all beacon positions, but beacons are installed at as many points as possible that may represent the environment. Beacons may be installed, for example, at a constant height on the ceiling or wall. Thereafter, the RSSI is measured by the scanner at each observation position. The measurement height of the scanner may be set to a constant value in a range of 1 m to 1.5 m from the floor in consideration of the manner of carrying the scanner. The measurement of the signal strength is performed on a pair of a beacon and a scanner. The parameters of the path loss model may be determined based on the measured values. By using the parameters of the path loss model obtained at the measured sample beacon position, the RSSI value at the surrounding position may be estimated so that the path loss model with a high resolution may be completed.

In the optimal installation plan determination operation 330, an installation plan in which different beacon signals, whose reception signal strengths calculated using the path loss model have significant values at all the observation positions, are received in a number greater than or equal to a minimum reference number and the total number of the beacons installed is minimum among all possible installation plans for the beacon positions is determined as the optimal installation plan. Here, the RSSI value being greater than a reference value that is sufficient for positioning is defined as being significant.

In the embodiment, the scanner calculates the distance from each beacon on the basis of the RSSI of the signal received from the beacon. When a distance is given, the RSSI value is not deterministically determined but has a stochastic distribution with a mean and a standard deviation. When the RSSI value is lower than or equal to the reference value, a stochastic component becomes a main component so that the distance estimation is not performable. The reference value for determining whether the RSSI value is significant enough to measure the distance may vary depending on the environment of the target space or the specification of the beacon or scanner. In general, when the RSSI value is large, the standard deviation of the signal strength value is small and the position estimation precision increases. Therefore, the reference value may be set to be high in an area that requires a high position precision. In this case, the reference value of the RSSI value may be a function of a position, for example, a function of an observation position. As the reference value increases, the number of required beacons increases.

When the significant RSSI values are secured in a number greater than or equal to the minimum reference number, e.g., three or more distance values according to the embodiment, the position may be calculated using trilateration. Since the received signal is a signal distorted by fading, noise, or interference, the RSSI value is calculated through preprocessing. Since various technologies for the preprocessing technique are generally known, a detailed description thereof will be omitted. When the number of beacons having the significant RSSI value is excessively large, interference between the beacons increases, which has a negative influence on the position calculation. According to an additional aspect, preferably, the number of beacons having the significant RSSI value is greater than or equal to a minimum reference number and less than or equal to a maximum reference number.

According to "An iBeacon based Proximity and Indoor Localization System," Faheem Zafari, loannis Papapanagiotou, Michael Devetsikiotis, and Thomas Hacker, the maximum reference number is seven.

Referring to FIG. 3, in the embodiment, first, one of beacon installation plans possible for all beacon grids is selected (331). For example, in the all beacon grids, the number of combinations of deploying beacons in respective beacon grids in response to the number of beacons, that is, one beacon, two beacons, three beacons, ..., is obtained as $_MC_1, _MC_2, _MC_3, \ldots$ when the number of beacon grids is M.

When one of the beacon installation plans is selected, the RSSI values are calculated at all observation positions for beacon positions belonging to the installation plan (333). First, one of the possible observation positions is selected. Subsequently, the RSSI value of the selected observation position is calculated with respect to the beacon positions belonging to the installation. The RSSI value is expressed by Expression 1 and calculated using the path loss model determined through a measurement experiment. When the number of the RSSI values calculated as being significant, that is, greater than or equal to the reference value, is greater than or equal to the minimum reference number, e.g., three according to the embodiment, the beacon installation plan may become a candidate for the optimal installation plan (334). Upon finding, during the calculation, that the number of the RSSI values calculated as being greater than or equal to the reference value is less than or equal to the minimum reference number, the process immediately jumps to the next installation plan. According to an additional aspect, a beacon installation plan in which the number of beacons whose RSSI values are calculated as being significant, that is, greater than or equal to the reference value at a particular position, is more than a maximum reference number, e.g., seven according to the embodiment, the beacon installation plan may be excluded from being the candidate for the optimal installation plan. Information about the beacon installation plan that may become the candidate for the optimal installation, for example, the total number and the positions of beacons installed in the beacon installation plan, is stored in a memory (335). Thereafter, it is checked whether operations 333 to 335 have been completed for all the beacon installation plans (337), and if not, the process returns to operation 331 selecting the next beacon installation plan. When the operations are completed for all of the beacon installation plans, an installation plan in which the total number of installed beacons is the smallest among the stored candidates for the optimal installation plan is determined as the optimal installation plan (337). Then, the determined optimal installation plan is output (350). In the embodiment, the calculated optimal installation plan may be output by displaying beacon grids, in which beacons are installed, in red on a map in which the target space is partitioned by beacon grids and observation grids. Since the embodiment shown in FIG. 3 checks whether the number of measurement values significant at all observation positions is within a reference number range for all beacon installation plans, and the optimum installation plan is derived based on the result, and thus, a relatively long calculation time may be required.

According to an additional aspect, the optimal installation plan may be determined as a beacon installation plan that minimizes an objective function expressing the total number of beacons installed in the target space under a constraint expressing the possibility of positioning at a measuring point.

Figure 4:
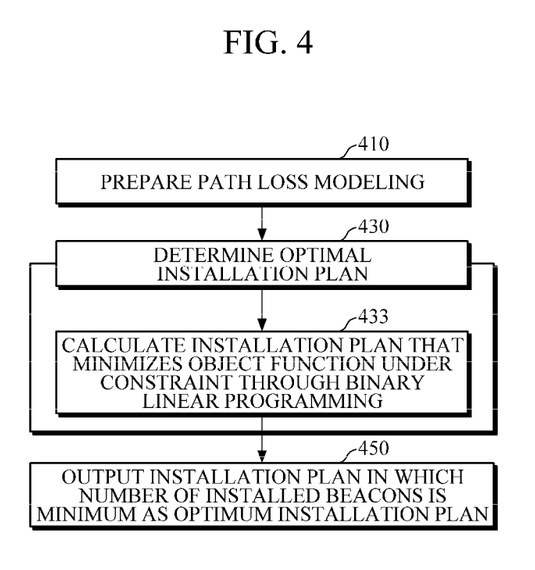
FIG. 4 is a flowchart showing the configuration of a design methodology of a positioning system according to another embodiment.

FIG. 4 is a flowchart showing the configuration of a design method of a positioning system according to another embodiment. Referring to FIG. 4, the design method of the positioning system according to the embodiment includes a path loss modeling preparation operation 410 and an optimal installation plan determination operation 430. Since the path loss modeling preparation operation 410 is similar to the corresponding configuration of the embodiment of FIG. 3, the description thereof is omitted.

In the optimal installation plan determination operation 430, among all possible installation plans for the beacon positions, an installation plan in which different beacon signals, whose RSSIs calculated using a path loss model have significant values at all the observation positions, are received in a number greater than or equal to a minimum reference number and a total number of the beacons installed is minimum is determined as an optimal installation plan.

According to one aspect, the total number of beacons installed in the target space is defined as an objective function. In the embodiment, the objective function may express a beacon installation plan as a function of summing binary function terms having a value of 1 when a beacon is installed at a beacon position i defined in the target space and having a value of 0 when a beacon is not installed at the beacon position i with respect to all the beacon positions. The beacon position may be set to the center of the beacon grid.

$$f(B) = \Sigma_i B_i \qquad \text{[Expression 2]}$$

Here, it can be seen that a term $B_i$ is a binary function.

When the objective function is expressed as a determinant, a problem of solving the objective function that minimizes the number of beacon installations may be expressed as the following determinant.

$$\min_x cx \qquad \text{[Expression 3]}$$

Here, c is an N-dimensional row vector in which all elements have a value of 1, and x is an N-dimensional vector representing a beacon installation plan in which an $i_{th}$ element has a value of 1 when a beacon is installed in an $i_{th}$ beacon grid and has a value of 0 when a beacon is not installed in the $i_{th}$ beacon.

$$x \in \mathcal{B}^N, \ \mathcal{B} = \{0,1\}$$

Finally, the optimal design is defined as a method of finding x that minimizes the value of cx calculated for all combinations of installation plans.

According to an additional aspect, the constraint is expressed using a constraint matrix that expresses whether a signal received at a scan grid j upon being transmitted from a beacon grid i has a significant RSSI value. When the number of beacon grids is N and the number of measurement grids is M, the constraint matrix may be defined as an M×N matrix. In the embodiment, the constraint matrix is determined such that an element (j,i) has a value of 1 when the RSSI value of a signal is received at an observation position j upon being transmitted from a beacon position I and has a value of 0 otherwise. Such a constraint matrix may be defined as a single matrix common to all beacon installation plans. As another example, the constraint matrix may be differently defined according to beacon installation plans or according to several groups of beacon installation plans in consideration of interference between beacons. Assuming that RSSI values only in a certain range around the beacon are greater than or equal to a reference value in general, when the beacon grids and the observation grids are similarly set and indexed in the same order, the constraint matrix becomes a matrix that has a value of '1' only around diagonal terms and is filled with '0' in the remaining terms.

When the constraint matrix is referred to as A, the constraint so that beacons, whose RSSIs are calculated using the path loss model, have a significant value at all observation positions exist in a number greater than or equal to a minimum reference number may be expressed by the following determinant.

$$Ax \geq B_{lower} \qquad \text{[Expression 4]}$$

Herein, $B_{lower}$ is an M-dimensional vector with the following value.

$$B_{lower} = [1 1 \ \ldots \ 1]^T \times B_{lo} \quad B_{lower} \in N^M$$

Here, N is a set of natural numbers, and $B_{lo}$ is a constant that is a lower limit of the number of significant beacons.

The inequality may implement the constraint so that beacons, whose RSSI values of received signals are significant at all observation positions, exist in a number greater than or equal to a minimum reference number in a particular installation plan.

As another example, when the constraint matrix is referred to as A, the constraint so that beacons, whose RSSIs are calculated using the path loss model, have a significant value at all observation positions exist in a number greater than or equal to a minimum reference number and less than or equal to a maximum reference number may be expressed by the following determinant.

$$Ax \geq B_{lower}$$

$$Ax \leq B_{upper} \qquad \text{[Expression 5]}$$

Here, A, x, $B_{lower}$ are the same as those described above. $x \in \mathcal{B}^N$, $\mathcal{B} = \{0,1\}$ In addition, $B_{upper}$ is an M-dimensional vector with the following value.

$$B_{upper} = [11 \ldots 1]^T \times B_{up} \quad B_{upper} \in N^M$$

Here, N is a set of natural numbers, and $B_{up}$ is a constant that is an upper limit of the number of significant beacons.

The above may implement the constraint so that beacons, whose RSSI values of received signals are significant at all observation positions, exist in a number greater than or equal to a minimum reference number Bio and less than or equal to a maximum reference number $B_{up}$ in a particular installation plan.

According to an additional aspect, the optimization problem of determining the optimal installation plan may be solved by binary linear programming.

In the embodiment of the proposed invention, the problem of obtaining an optimal installation plan when a target space is given may be expressed mathematically as follows.

$$\min_{x} cx \qquad \text{[Expression 6]}$$

Under a constraint, $$Ax \geq B_{lower}$$

$$Ax \leq B_{upper}$$

Herein, C is an N-dimensional vector, in which C=[11 . . . 1].

The problem of minimizing the objective function cx takes the form of linear programming. Furthermore, since the optimization variable x has a value of 0 or 1, the problem involves mixed integer linear programming, particularly, binary linear programming. The binary linear programming problem is one of NP complete problems and has a great complexity compared to the linear programming problem but may be effectively solved using methods such as a cutting plane method or a branch and cut method (433). Such a binary linear programming problem has an increasing calculation time as the number of grids increases.

In the embodiment, the calculated optimal installation plan may be output by displaying beacon grids in which beacons are installed in red on a map in which the target space is partitioned by beacon grids and observation grids (450).

According to an additional aspect, the constraint matrix defining the constraint may be expanded such that the corresponding elements each have one value among a predetermined number of values in a range of 0 to 1 according the range of the RSSI value of the signal received at the observation position j upon being transmitted from the beacon position i. For example, the corresponding element may be assigned to be 0 when the RSSI value is less than a first reference value, may be assigned to be 0.5 when the RSSI value is greater than or equal to the first reference value and less than or equal to a second reference value, and may be assigned to be 1 when the RSSI value is greater than the second reference value. The range of the first reference value to the second reference value is a range of values in which positioning is performable but positioning precision is low due to insufficient RSSI. In this case, the second reference value may be determined as a value in which two RSSI values may provide a certain positioning precision approximating that of one value having a sufficient RSSI. Two weak beacon signals in the range provide a positioning precision corresponding to that of one strong beacon signal. In this case, when the number of beacon grids is N and the number of measurement grids is M, the constraint matrix may be defined as an M×N matrix.

In some cases, there is a need to install a beacon at a particular beacon position. In this case, the objective function may have a form obtained by subtracting a predetermined number from a formula expressing the total number of beacons installed in an area of the target space except for a predetermined position that is determined for installation in advance. That is, an area of the target space except for a position that is predetermined for installation in the above described general case may be determined as a new target space. In the new target space, an objective function as described above is defined. The objective function expresses the total number and the installed positions of installed beacons for each beacon installation plan in the new target space. A formula of the objective function minus a predetermined number of installations to be installed in advance provides a new objective function.

On the other hand, when a constraint matrix expressing whether a RSSI value of a signal received at an observation position j upon being transmitted from a beacon position i is in a range of significant values in the area of the target space except for the predetermined position for installation is referred to as A, and a constraint vector, which is a column vector representing whether a RSSI value of a signal received at each observation position with respect to a beacon located at the predetermined position for installation, is referred to as a prior decision vector $b_{prior}$, a new constraint may be expressed as follows.

$$Ax \geq B_{lower} - b_{prior}, \quad Ax \leq B_{upper} - b_{prior}$$

According to an additional aspect, the constraint Expression 4 or 5 may be defined for each direction of the target space. Specifically, the constraint is expressed using a constraint matrix in which an element (i, j) has a value expressing whether a RSSI value of a signal received at an observation position j upon being transmitted from a beacon position i has a direction component in a range of significant values. Accordingly, the beacon distribution may become uniform in each direction.

When the angle formed between a line connecting the beacon position i to the observation position j and the X axis is $\theta_{ji}$, the constraint of Expression 4 for the target space may be expressed as an optimization problem according to two dimensional directions with X and Y direction constraints as follows.

$$A_x x \geq B_{lower,x}$$

$$A_y x \geq B_{lower,y}$$

Here, if an entry of (j, i) is 1 (a case having an entry of 0 causes projections in the X and Y directions to be zero and thus is out of the question), an element (j, i) of a matrix $A_x$ and an element (j, i) of a matrix $A_y$ are defined as follows.

$$(A_x)_{j,i} = \cos^2\theta_{ji},$$

$$(A_y)_{j,i} = \sin^2\theta_{ji},$$

In addition, matrixes $B_{lower,\ x}$ and $B_{lower,\ y}$ are column vectors in which each element is defined as follows.

$$(B_{lower,x})_i = \frac{B_{lo}}{2},$$

$$(B_{lower,y})_i = \frac{B_{lo}}{2}.$$

Here, $B_{lo}$ is a constant that is the lower limit of the number of significant beacons.

As is apparent from the above, a tool for efficiently designing the optimal installation positions of beacons in a beacon-based positioning system can be provided. The use of the tool can provide a beacon-based positioning system that ensures a required positioning precision at minimal cost. Furthermore, a beacon-based positioning system that ensures a required positioning precision can be designed by reflecting a constraint of beacon installation that may exist in an installation space.

Although the exemplary embodiments of the present invention have been described in the specification and the accompanying drawings, the exemplary embodiments are intended to not limit the technical spirit of the present invention, and those skilled in the art should appreciate that various substitutions, modifications, and changes are possible without departing from the scope and spirit of the present invention, and all modifications and equivalents come within the scope of the appended claims.

What is claimed is:

1. A method of designing a positioning system in a target space by a modeling guide device having a beacon driver and a scanner communicator, the method comprising:
   receiving, by the scanner communicator, information on a received signal strength indicator (RSSI) measured by a particular scanner at a sampled observation position in a target space from a signal transmitted by a particular beacon at a sampled beacon position in the target space;
   determining, by the modeling guide device, a path loss model of a radio frequency (RF) signal for all combinations of beacon positions and observation positions defined in the target space by determining parameters of the path loss model using the measured RSSIs transmitted by scanners;
   determining, by the modeling guide device, significant RSSIs which are selected from the calculated RSSIs and are greater than or equal to a reference value, wherein the calculated RSSIs are calculated using the path loss model for all combinations of the beacon positions and the observation positions defined in the target space;
   determining, by the modeling guide device, a constraint in which a number of the significant RSSIs for each observation position is greater than or equal to a minimum reference number; and
   determining, by the modeling guide device, an optimal installation plan for the beacon positions, which minimizes an objective function expressing the number of beacons, among candidates for the optimal installation plan, which satisfy the constrain.

2. The method of claim 1, further comprising:
   communicating, by a beacon driver, the beacons to select a particular beacon to set parameters of wireless communication or instruct start or end of transmission.

3. The method of claim 1, wherein the objective function is expressed as a function of summing binary function terms having a value of 1 when a beacon is installed at a beacon position i defined in the target space and having a value of 0 when a beacon is not installed at the beacon position i with respect to all the beacon positions for each of the beacon installation plans.

4. The method of claim 1, wherein the constraint is expressed using a constraint matrix in which an element (j, i) has a value expressing whether the RSSI value of a signal received at an observation position j upon being transmitted from a beacon position i is greater than or equal to a reference value.

5. The method of claim 4, wherein the constraint is expressed as an inequality expression that a product of the constraint matrix and an installation plan vector in which an element (i) has a value of 1 when a beacon is installed at a beacon position I and has a value zero (0) when a beacon is not installed at the beacon position i is greater than or equal to a lower limit reference vector in which all elements are the same minimum reference number.

6. The method of claim 4, wherein the constraint matrix is a matrix in which each of the corresponding elements has one value among a predetermined number of values in a range of 0 to 1 according a range of the calculated RSSI value of the signal received at the observation position j upon being transmitted from the beacon position i.

7. The method of claim 6, wherein the constraint matrix is a matrix in which the element (j, i) has a value of 1 when the calculated RSSI value of the signal received at the observation position j upon being transmitted from the beacon position i is greater than or equal to a reference value and has a value of 0 otherwise.

8. The method of claim 6, wherein the constraint matrix is a matrix in which the element (j, i) has a value of 0 when the calculated RSSI value of the signal received at the observation position j upon being transmitted from the beacon position i is less than a first reference value, has a value of 0.5 when the calculated RSSI value of the received signal is greater than or equal to the first reference value and less than or equal to a second reference value, and has a value of 1 when the calculated RSSI value of the received signal is greater than the second reference value.

9. The method of claim 7, wherein determining the optimal installation plan includes calculating a beacon installation plan that minimizes the objective function by binary linear programming.

10. The method of claim 1, wherein the objective function is obtained by subtracting the number of predetermined beacons which are to be installed at particular beacon positions from a total number of beacons installed in an area of a new target space except for a position that is determined for installation of predetermined beacons in advance in an area of the target space.

11. The method of claim 10, wherein the constraint is expressed as an inequality expression including a constraint matrix that expresses whether the calculated RSSI value of a signal received at an observation position j upon being transmitted from a beacon position i is greater than or equal to a reference value in the area of the new target space except for the position determined for installation of predetermined beacons in advance in an area of the target space.

12. The method of claim 1, wherein the constraint is defined according to two dimensional directions with X and Y direction of the target space.

13. The method of claim 12, wherein the constraint is expressed using a X directional constraint matrix in which an element (j, i) has a value of square of projection in the X direction of 1 when the calculated RSSI value of a signal received at an observation position j upon being transmitted from a beacon position i is greater than or equal to a reference value, and a Y direction constraint matrix in which an element (j, i) has a value of square of projection in the Y direction of 1 when the calculated RSSI value of a signal received at an observation position j upon being transmitted from a beacon position i is greater than or equal to a reference value.

14. A computer program storage device using the method according to claim 1.

15. A computer program storage device using the method according to claim 9.

* * * * *